Figure 1:
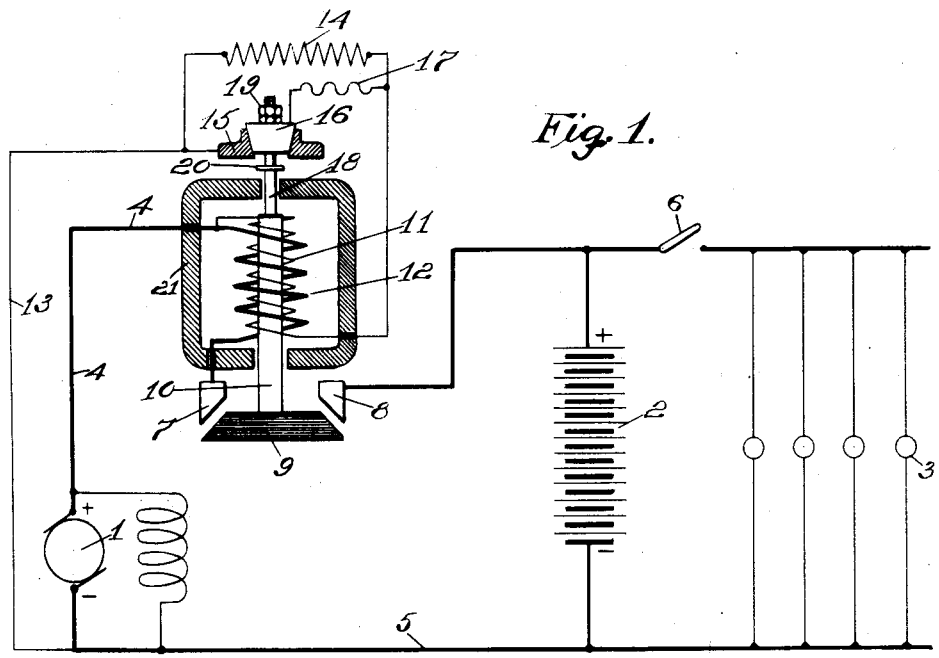

No. 872,215. PATENTED NOV. 26, 1907.
W. L. BLISS.
AUTOMATIC ELECTRIC SWITCH.
APPLICATION FILED JAN. 6, 1905.

WITNESSES:
Herbert J. Smith
Edwin B. H. Tower, Jr.

INVENTOR
William L. Bliss.
BY
Jones & Addington
ATTORNEYS

UNITED STATES PATENT OFFICE.

WILLIAM L. BLISS, OF BROOKLYN, NEW YORK.

AUTOMATIC ELECTRIC SWITCH.

No. 872,215.  Specification of Letters Patent.  Patented Nov. 26, 1907.

Application filed January 6, 1905. Serial No. 239,927.

*To all whom it may concern:*

Be it known that I, WILLIAM L. BLISS, a citizen of the United States, residing at Brooklyn, in the county of Kings and State of New York, have invented new and useful Improvements in Automatic Electric Switches, of which the following is a full, clear, concise, and exact description, reference being had to the accompanying drawing, forming a part of this specification.

The present invention relates to improvements in automatic electric switches which are particularly adapted to be employed in car lighting systems.

In systems of car lighting employing a generator and a storage battery for operating the lamps, it is usually necessary to provide an automatic switch which will connect the storage battery and the lamps to the generator when the generator is operative and which will disconnect the storage battery and the lamps from the generator when the generator is inoperative. The automatic switch which is usually employed for this purpose is provided with a winding of comparatively high resistance connected in shunt across the terminals of the generator and another winding of comparatively low resistance connected in series with the generator and the storage battery. When the voltage of the generator is equal to the voltage of the battery, the shunt winding causes the switch to close. The series winding will assist the shunt winding in keeping the switch closed so long as the generator sends current through the series winding; but when the generator voltage falls below the battery voltage so that current from the battery will flow backward through the series winding, said series winding will oppose said shunt winding, thereby causing the switch to open.

The present invention relates particularly to a switch such as has been characterized, and it has for the object thereof to provide means which will reduce the current flowing through the shunt winding after the switch closes, and thus prevent the shunt solenoid from becoming overheated by an excessive current flowing through the same, and also reduce the current which must flow backward through the series winding from the battery to cause the switch to open.

The accompanying drawings illustrate a system of car lighting wherein an automatic switch made in accordance with the present invention is employed. It will be understood, of course, that the switch may be applied to other purposes, and, further, that it may be constructed in various ways.

Figure 2:
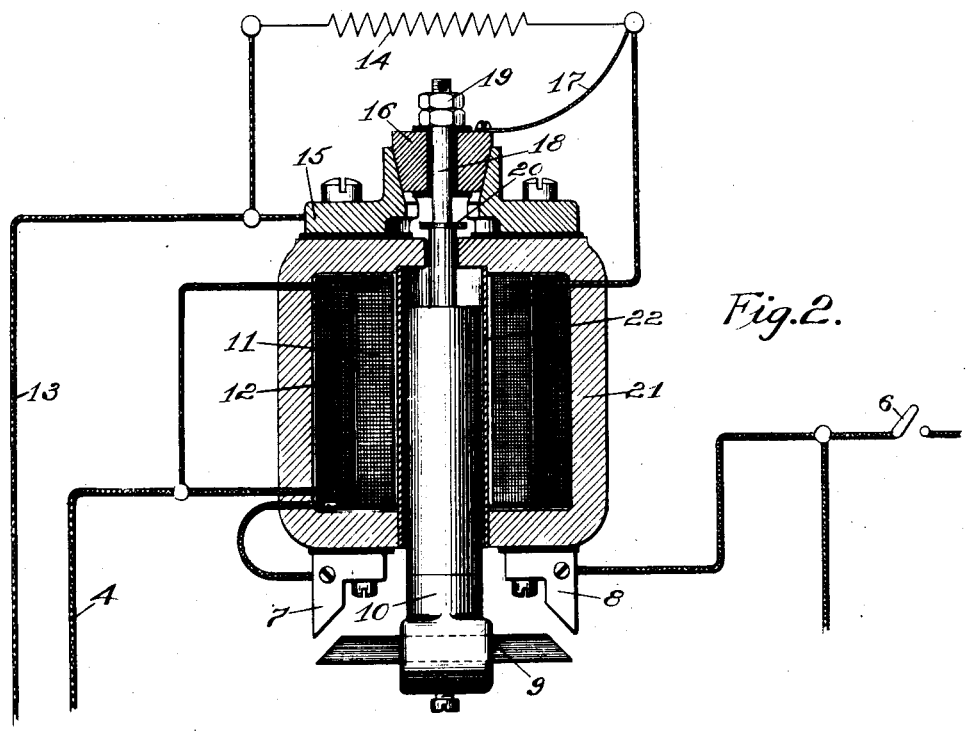

The views in the drawings are as follows:

Figure 1 illustrates a car lighting system provided with an automatic switch embodying the present invention, and Fig. 2 illustrates a switch which has been developed for practical purposes, said switch being shown in section.

The system shown in the drawings is provided with a generator 1, a storage battery 2 and translating devices 3, said storage battery and said translating devices being connected to said generator by mains 4 and 5 of a supply circuit. The storage battery and lamps are preferably connected in circuit in parallel, and the circuit of the lamps is preferably controlled by a switch 6. If it is necessary, a suitable automatic regulator may be provided to confine the output of the generator within prearranged limits, and another automatic regulator may be provided to regulate the voltage impressed upon the translating devices.

The automatic switch which controls the supply circuit may be provided with stationary contacts 7 and 8 arranged in the supply circuit, and a movable contact 9 adapted to engage said stationary contacts and made of flexible material. The movable contact may be carried by a core or plunger 10 which may be surrounded by windings 11 and 12, said windings being provided to operate the switch. The winding 11 is preferably made of fine wire and connected in a shunt-circuit 13 which extends across the supply circuit or generator terminals, and the winding 12 is preferably made of coarse wire and arranged in the supply circuit in series with the switch contacts.

Whenever the voltage of the generator is equal to or greater than that of the battery, the winding 11 will raise the plunger 10, thereby bringing the movable contact 9 into engagement with the stationary contacts 7 and 8 to close the supply circuit. The generator may then send current from the positive terminal thereof through supply main 4, winding 12, switch contacts 7—9—8, thence dividingly through the storage battery 2 and the translating devices 3, and finally through supply main 5 to the negative terminal thereof. So long as the generator sends current through the supply circuit, the action of the shunt winding 11 will be supplemented by the action of the series winding 12. But when the battery sends current backward through the supply circuit, which occurs when the generator voltage is less than the battery voltage, the action of the shunt winding 11 will be opposed by the action of the series winding 12, and in consequence, the plunger 10 will fall, thereby removing the movable contact 9 from engagement with the stationary contacts 7 and 8. The switch will thus operate to connect the storage battery and the translating devices to the generator whenever the generator voltage is equal to or greater than that of the battery, and to disconnect the storage battery and the translating devices from the generator whenever the voltage of the generator is less than that of the battery.

The shunt circuit 13 is preferably provided with a resistance 14 which is arranged in series with the shunt winding 11. An auxiliary switch which is provided with a stationary contact 15 connected to the end of said resistance and a movable contact 16 connected to the other end of said resistance by a flexible connector 17 is employed to short circuit said resistance.

The movable contact is preferably loosely mounted upon a tail rod 18 which is mounted upon the plunger 10, said tail rod being preferably provided with collars 19 and 20, between which said movable contacts may move. When the plunger is down and accordingly the main switch is open, the auxiliary switch will close a short circuit around the resistance 14. The energizing current for the shunt winding may then flow from the positive terminal of the generator through the shunt winding 11, flexible connector 17, movable contact 16 and stationary contact 15 to the negative terminal of the generator. When the plunger is up and accordingly the main switch is closed, the auxiliary switch will be open and the resistance 14 will be in series with the shunt winding.

The collar 19 normally rests upon the movable contact 16 and thereby determines the lower position of the plunger 10. The collar 20 is located upon the tail rod 18 at such a distance from the collar 19 that a certain amount of upward motion of the plunger is permitted before the collar 20 engages the movable contact 16 and thereby opens the auxiliary switch. The movable contact 9 will spring upwardly at the center after it engages the stationary contacts, and thus the plunger 10 will be permitted to rise until the movable contact 16 is raised from the stationary contact 15. The resistance 14 being in circuit after the auxiliary switch opens, the current flowing through the shunt winding will be decreased. The strength of the shunt winding being thus decreased and a downward pressure being exerted upon the plunger by the retractile force of the movable contact 9, it will require only a moderate amount of current to flow through the series winding in a reverse direction to neutralize the effect of the shunt winding and thus cause the plunger to move downwardly and thereby open the main switch. Upon the downward movement of the plunger, the movable contact 16 will remain out of engagement with the stationary contact 15 until the movable contact 9 is just about to leave the stationary contacts 7 and 8.

The shunt winding may be arranged within the series winding and the two windings may be mounted within a frame or casing 21 which may form a magnetic circuit. The arrangement of said windings in this way permits the shunt winding to be made comparatively small and further makes it possible to provide the series winding with a large radiating surface for dissipating the heat therefrom. The stationary contacts 7 and 8 of the automatic switch and the stationary contact 15 of the short circuiting switch may be mounted upon the frame 21, and the plunger 10 may be arranged within a tube 22 of non-magnetic material.

The switch of the present invention may be applied to purposes other than those which have been set forth herein and it will be understood that the switch may be constructed in various ways.

Having thus described my invention, what I claim as new and desire to secure by Letters Patent is:

1. In an automatic electric switch, in combination, a winding adapted to be connected in circuit in shunt, a winding adapted to be connected in circuit in series, a movable switch element adapted to be operated by said windings, said shunt winding being adapted to operate said switch element to close said switch initially, and automatically operated means adapted to reduce the current flowing through said shunt winding from an operating current to a retaining current while the switch is closed.

2. In an automatic electric switch, in combination, a winding adapted to be connected in circuit in shunt, a winding adapted to be connected in circuit in series, a switch element adapted to be operated by said windings, a resistance arranged in series with said shunt winding, an auxiliary switch adapted to short circuit said resistance, and a mechanical connection between said switch element and said auxiliary switch.

3. In combination, a generator, a storage battery, translating devices, a supply circuit connecting said storage battery and said translating devices to said generator, a winding arranged in shunt with said generator, a winding arranged in series with said generator and said storage battery, a movable contact controlling said supply circuit and operated by said windings, a resistance arranged in series with said shunt winding, an auxiliary switch adapted to short circuit said resistance, and a mechanical connection between said movable contact and said auxiliary switch, said connection being adapted to open said auxiliary switch when said movable contact closes said supply circuit.

4. In combination, a main switch having a movable contact, a winding adapted to be connected in circuit in shunt, a winding adapted to be connected in series, said windings being adapted to operate the movable contact of said main switch, a resistance arranged in series with said shunt winding, an auxiliary switch having a movable contact and adapted to short circuit said resistance, and a mechanical connection between the movable contact of said main switch and the movable contact of said auxiliary switch, said mechanical connection being adapted to open the auxiliary switch upon the closing of the main switch.

5. In an automatic electric switch, in combination, a winding adapted to be connected in circuit in shunt, a winding adapted to be connected in circuit in series, a main switch having a movable contact, said movable contact being operated by said windings, a resistance arranged in series with said shunt winding, an auxiliary switch adapted to short circuit said resistance and having a movable contact, a mechanical connection between the movable contact of said main switch and the movable contact of said auxiliary switch, said mechanical connection being adapted to permit sufficient freedom of movement between said movable contacts to allow said main switch to close before said auxiliary switch opens.

6. In combination, a main switch, a winding adapted to be connected in circuit in shunt, a winding adapted to be connected in circuit in series, said main switch being operated by said windings, a resistance arranged in series with said shunt winding, an auxiliary switch adapted to close a short circuit around said resistance, means for operating said auxiliary switch to open said short circuit upon the closing of said main switch, said means being adapted to open said auxiliary switch after the main switch closes.

7. In combination, a main switch, a winding made of comparatively fine wire, a winding made of comparatively coarse wire, said main switch being operated by said windings, a resistance arranged in series with the former winding, an auxiliary switch adapted to close a short circuit around said resistance, a mechanical connection arranged between said main switch and said auxiliary switch and adapted to operate said auxiliary switch to open said short circuit upon the closing of said main switch, said mechanical connection being adapted to open said auxiliary switch after said main switch closes.

8. In combination, a generator, a storage battery, translating devices, a supply circuit connecting said storage battery and said translating devices to said generator, a winding arranged in circuit in shunt with said generator, a winding arranged in circuit in series with said generator and said storage battery, a movable switch contact controlling said supply circuit and operated by said windings, and automatically operated means adapted to reduce the current flowing through said shunt winding from an operating current to a retaining current after said movable contact closes said supply circuit.

9. In combination, a generator, a storage battery, translating devices, a supply circuit connecting said storage battery and said translating devices to said generator, a winding arranged in circuit in shunt with said generator, another winding arranged in circuit in series with said generator and said storage battery, a movable contact adapted to control said supply circuit and operated by said windings, a resistance arranged in series with said shunt winding, a movable switch contact controlling a short circuit around said resistance, a mechanical connection between said movable contacts adapted to operate the latter movable contact to open said short circuit upon the operation of the former movable contact to close said supply circuit, said mechanical connection being adapted to permit sufficient freedom of movement between said contacts to allow the former movable contact to close said supply circuit before the latter movable contact opens said short circuit.

10. In an automatic electric switch, in combination, stationary contacts, a movable contact adapted to engage said stationary contacts, a plunger having said movable contact carried thereby, a winding adapted to be connected in circuit in shunt, a winding adapted to be connected in circuit in series, said plunger being operated by said windings, a movable contact for closing a short circuit around said resistance while the former movable contact is out of engagement with said stationary contacts, the latter movable contact being movably mounted upon said plunger, and a stop carried by said plunger and adapted to engage the latter movable contact to operate the same to open said short circuit after the former movable contact engages said stationary contacts.

11. In an automatic electric switch, in combination, stationary contacts, a movable contact adapted to connect said stationary contacts, said movable contact being made of flexible material and having the ends thereof adapted to engage said stationary contacts, a plunger having said movable contact carried thereby, said plunger being connected to the central portion of said movable contact, a winding adapted to be connected in circuit in shunt, another winding adapted to be connected in circuit in series, said plunger being actuated by said windings, a resistance arranged in series with said shunt winding, a movable contact for closing a short circuit around said resistance while the former movable contact is out of engagement with said stationary contacts, the latter movable contact being movably mounted upon said plunger, and a stop carried by said plunger, said stop being adapted to engage the latter movable contact to operate the same to open said short circuit around said resistance after the former movable contact engages said stationary contacts.

12. In an automatic electric switch, in combination, stationary contacts, a movable contact adapted to engage said stationary contacts, a plunger having said movable contact carried thereby, a winding adapted to be connected in circuit in shunt, another winding adapted to be connected in circuit in series, said plunger being operated by said windings, a resistance arranged in series with said shunt winding, a movable contact for closing a short circuit around said resistance while the former movable contact is out of engagement with said stationary contacts, a tail rod mounted upon said plunger and having the latter movable contact movably mounted thereon, and a stop carried by said tail rod and adapted to engage the latter movable contact to open said short circuit after the former movable contact engages said stationary contacts.

13. In an automatic electric switch, in combination, a winding adapted to be connected in circuit in shunt, another winding adapted to be connected in circuit in series, the former winding arranged within the latter winding, a movable switch element operated by said windings, said switch element being operated by said shunt winding to close the said switch initially, and means for reducing the current in said shunt winding after the switch is closed.

14. In an electric switch in combination, a frame, a plunger, a movable contact connected to said plunger and adapted to engage stationary contacts, a winding adapted to be connected in circuit in shunt, another winding adapted to be connected in circuit in series, said shunt winding and said series winding being arranged one within the other and carried by said frame and said plunger being surrounded by said windings, a resistance arranged in circuit in series with said shunt winding, an auxiliary switch adapted to short-circuit said resistance, and means for opening said auxiliary switch when said movable contact engages said stationary contacts.

In witness whereof, I have hereunto subscribed my name in the presence of two witnesses.

WILLIAM L. BLISS.

Witnesses:
J. H. ROBERTSON,
HERBERT J. SMITH.